H. E. ROTTMER.
AUTOMOBILE BED.
APPLICATION FILED DEC. 10, 1917.

1,292,076.

Patented Jan. 21, 1919.
4 SHEETS—SHEET 3.

Inventor:
Henry E. Rottmer,
by Spear, Middleton, Donaldson & Spear
Attys.

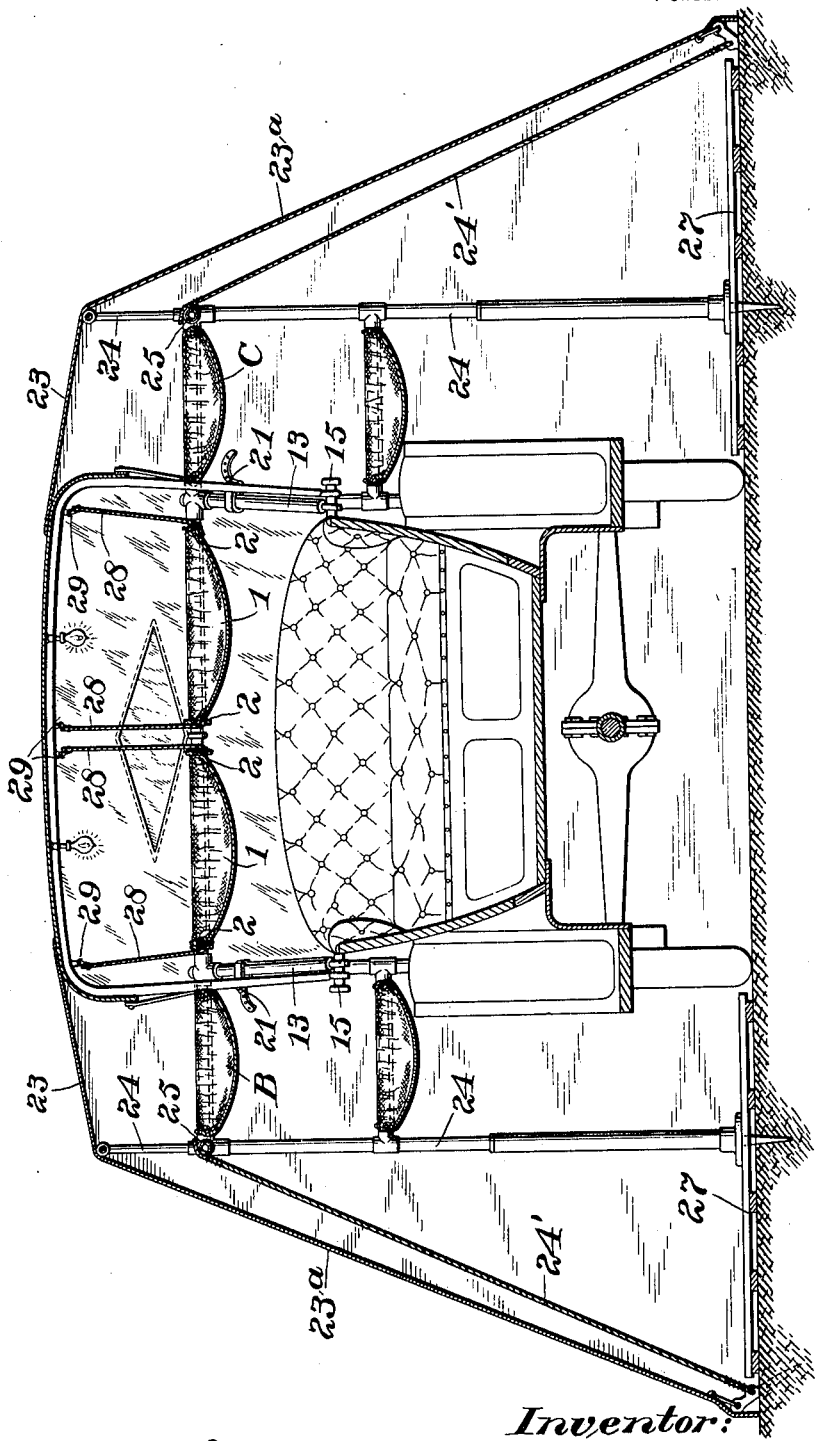

UNITED STATES PATENT OFFICE.

HENRY E. ROTTMER, OF WASHINGTON, DISTRICT OF COLUMBIA.

AUTOMOBILE-BED.

1,292,076.  Specification of Letters Patent.  Patented Jan. 21, 1919.

Application filed December 10, 1917.  Serial No. 206,505.

*To all whom it may concern:*

Be it known that I, HENRY E. ROTTMER, a citizen of the United States, and resident of Washington, District of Columbia, have invented certain new and useful Improvements in Automobile-Beds, of which the following is a specification.

My invention is an attachment to automobiles. It provides necessary sleeping quarters which can be quickly put in position for use and just as quickly rolled up and put out of the way.

The invention consists in the features and combination and arrangements of parts hereinafter described and particularly pointed out in the claims.

In the accompanying drawings:

Fig. 4 is a sectional view looking from front to rear, and illustrating further features of my invention.

In these drawings 1 indicates the cots or hammocks which are arranged side by side, and are supported above the seats. These cots are separate from each other in the sense that there is a divisional space between them running longitudinally of the car, which will enable the user to get onto the cot or hammock by passing through this space, it being necessary only to push the flexible supporting means of the cots aside sufficient for this purpose, and in leaving the cots the user can get down through this intermediate space. By this construction the safety of the user is insured in getting into and out of the cot, because entering or leaving through this central space he has the main body of the automobile beneath him and should he slip or miss his footing the danger of accidents will be minimized over what would be the case if the occupant had to enter or leave the cot at the extreme outer side of the car, though it will be understood that with my construction entrance to or exit from the cot may be accomplished at the side, if so desired.

The cots consist of longitudinal flexible connections 2, made of wire rope or the like stretched between the cross bars 3 and 4, these wire ropes having attached thereto the canvas body of the cots and this attachment may be made by providing the canvas with tubular edge portions through which the wire rope sides are passed. These flexible side members have rings 5 at their front and rear ends which are threaded onto the bars 3 and 4. The canvas cots may be hooked over the flexible connections instead of passing through a pocket in canvas.

Figure 1:
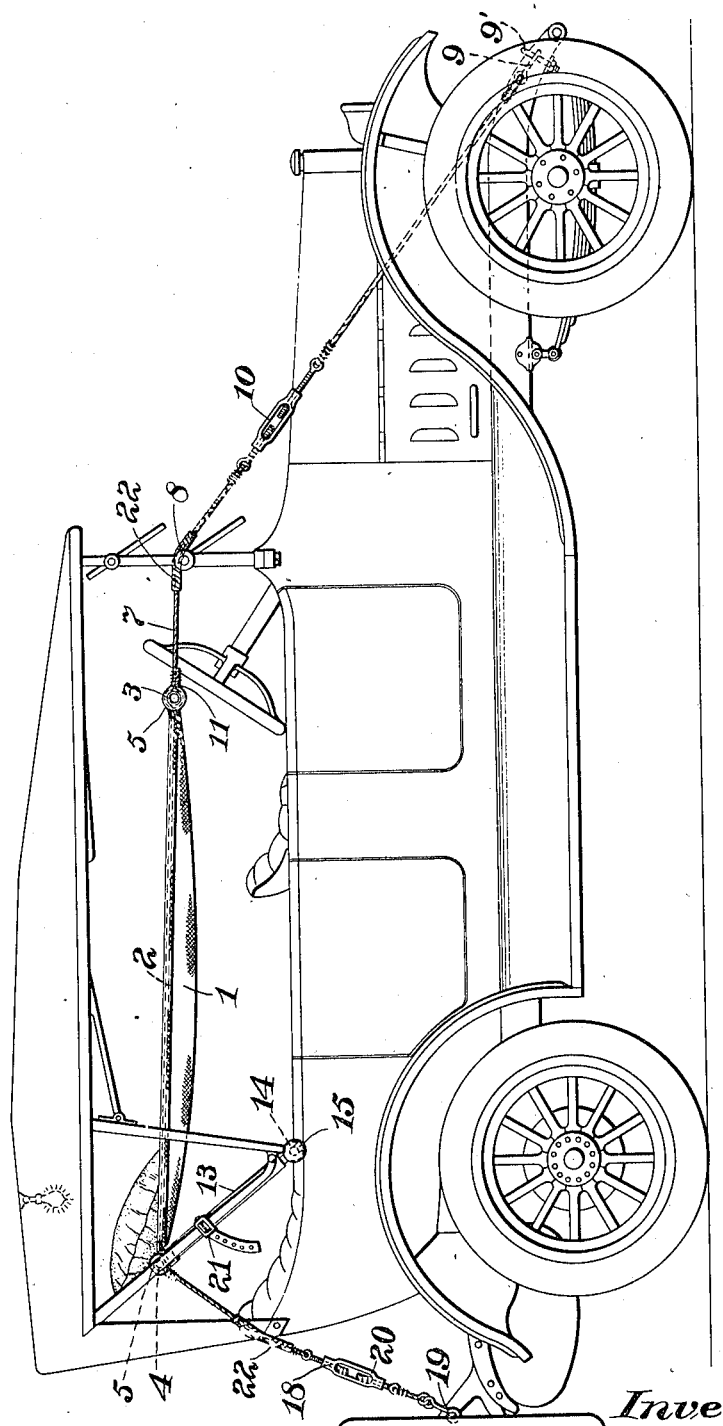
Figure 1 is a side elevation of an automobile with my attachment in place.
Figure 2:
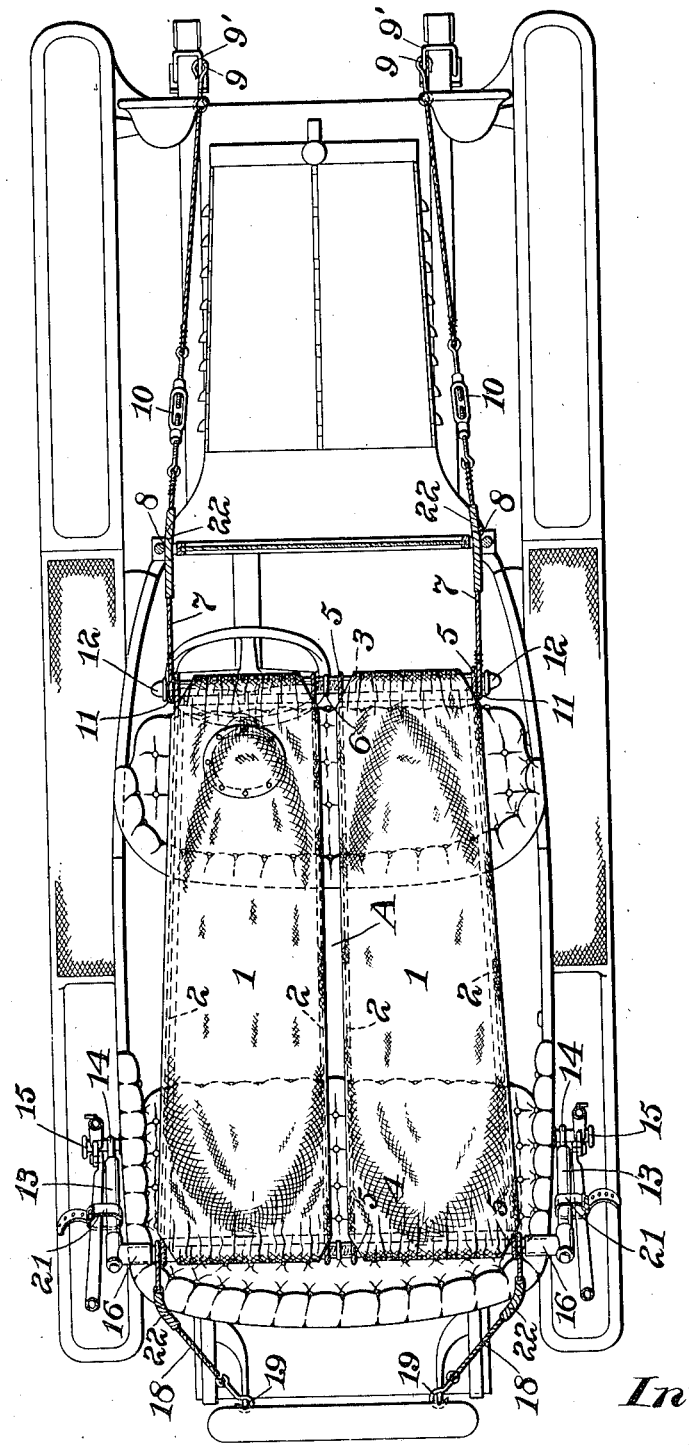
Fig. 2 is a plan view of the cots or hammocks in place on the automobile structure.
Figure 5:
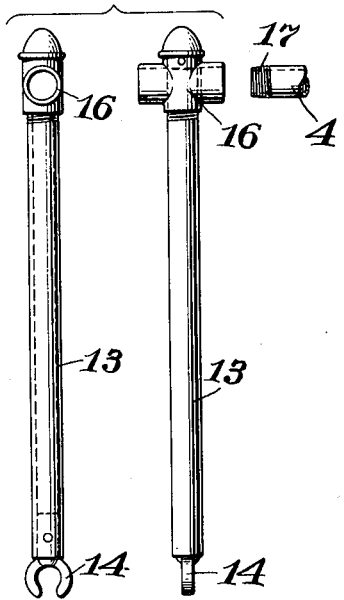
Figs. 5 and 6 are views of details.
Figure 6:
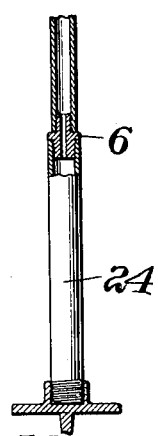
Figure 7:
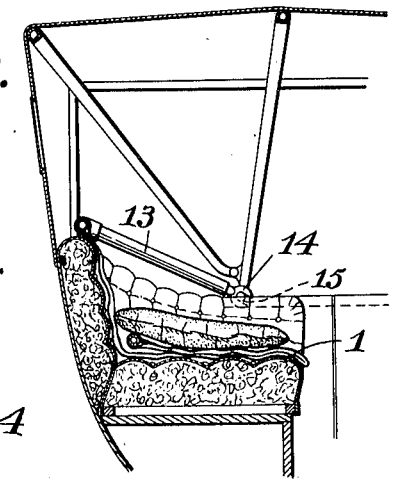
Fig. 7 is a detail view showing how the cots may be stored, when temporarily out of use.

The bars 3, 4 are made up of sections having a coupling between them at 6 of any suitable form, such as the screw-threaded one illustrated in Fig. 6. From the front bar 3 flexible supporting and straining connections 7 extend forwardly over suitable supporting means at 8 on the frame of the wind-shield, the extreme forward ends of these connections being suitably fastened to a forward part of the car for instance to a part of the main frame by means of a hook 9, and a suitable bracket 9'. These connections have turn buckles 10 by which the cots may be placed under longitudinal strain to hold them with sufficient tension to support the body of the user. These straining connections have rings or loops at 11, and any suitable form of caps at 12 may be used on the cross bar, which will hold the eyes or loops 11 in place. The rear cross bar 4 of the cot supporting frame is carried by standards 13 having forks 14 at their lower ends to engage the bow bracket or pin 15. The standards 13 are connected with the cross bar 4 by any suitable couplings as at 16, which receive the screw-threaded ends of the cross bar as indicated at 17 in Fig. 5. From the rear cross bar straining connections 18 extend to a suitable part of the car at the rear, where they are attached by hook 19 or other suitable means, turn buckles 20 being used in these connections to get the desired strain on the cots by pulling the standards 12 pivotally toward the rear. These standards may be additionally held or controlled by straps 21, passing around a part of the bow of the automobile top and around the standard also. At the points where the straining connections rest on any portion of the car buffer tubes or pieces 22 may be arranged so as to prevent damage to these supporting portions of the car. It will be seen from Fig. 1 that the cots or hammocks are supported well above the seats and there is head-room below the cots to enable a user to store articles beneath the cots or to enter this space in getting into or out of the cots through the intermediate space, indicated at A in Fig. 2.

Figure 3:
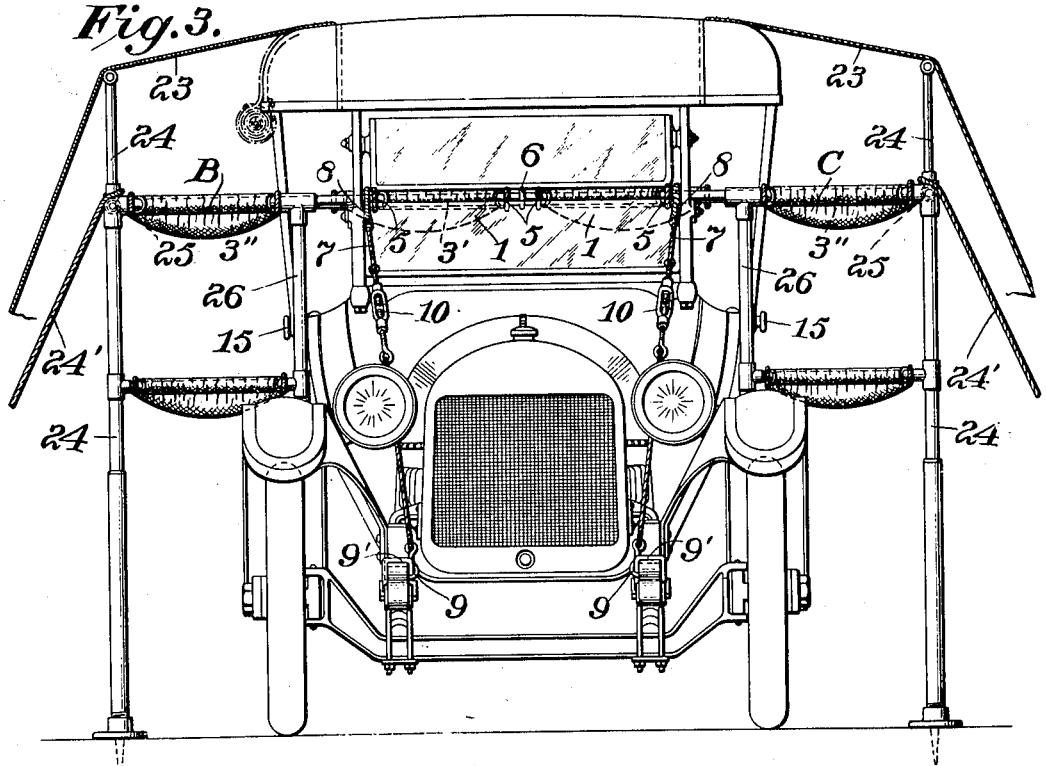
Fig. 3 is a front view of an automobile embodying my invention as shown in Figs. 1 and 2, and which consists of an extension of said invention and which provides additional sleeping quarters over those shown in Figs. 1 and 2.

As shown in Fig. 3 additional sleeping accommodations may be provided by using a covering 23 forming lateral extensions of the top of the car, this covering being supported by standards 24, the bases of which rest upon the ground, there being one of these standards in line with the front cross bar 3' and one in line with the rear cross bar, and suitable longitudinal connections indicated at 25 in dotted lines may connect these standards, and these standards also support lateral extensions 3'' of the cross bar 3' and similar lateral extensions of the rear cross bar are supported by the rear standard. Intermediate standards 26 may be employed with their bases resting on the running-boards. These lateral extensions of the cross bars are sufficient to afford supports for the additional cots shown at B, C. Any suitable guy-wires may extend from the standards or cross bars to the ground to support the frame from any desired direction. Platforms as at 27 may be employed at the sides of the car to make a comfortable footing for the users of the attachment.

As shown in Fig. 4 I provide means whereby privacy may be secured by the occupants of the automobile sleeping quarters, this consisting of flexible screens or walls 28 suitably attached to the sides of the canvas or other material forming the main body of the cots, these walls or screens reaching up and being removably secured as at 29 to the automobile top.

There may be one of these walls or screens for each edge of the cot, so that each user can at will screen either one or both sides of the cot or hammock.

What I claim is:

1. An automobile attachment comprising front and rear cross bars with a cot suspended between them, straining and supporting connections extending from the front cross bar and in contact with a part of the automobile to be supported thereby, the front ends of said connections being joined to a part of the car and flexible straining connections extending from the rear cross bar to a rear part of the car, the said rear cross bar being mounted on standards removably mounted on the bracket of the bows of the top of the car, substantially as described.

2. In combination in an attachment for automobiles a front cross bar, a rear cross bar, flexible connections between them, a cot held by said flexible connections, straining connections extending from the front and rear cross bars respectively to a point on the automobile, standards supporting the rear cross bar and pivotally mounted at their lower ends on a part of the rear bow of the top of the car, substantially as described.

3. In an attachment for automobiles of the ordinary touring car type a pair of cots supported above the seats and in a plane above the body and arranged side by side, with a restricted space between them, said cots having their adjacent sides flexible to be crowded aside to enlarge said restricted space for the passage therethrough of the occupants of the cots, substantially as described.

4. In combination in an attachment for automobiles a cot extending above the seats, a cross rod to which the rear edge of the cot is connected, standards for holding said cross rod, said standard being supported on the rear bow of the automobile top, a front support and straining connections at the front and rear of the cot, substantially as described.

5. In combination with an automobile of the ordinary touring car type an attachment comprising a rear cross bar with means for supporting the same above the rear seat, a pair of cots arranged side by side, but with an opening between them for the passage of the occupants therethrough, said cots being supported by said rear cross bar and extending above the front and rear seats and supporting means for the front of the pair of cots, substantially as described.

6. In combination with an automobile and its top, a cot or hammock, supporting means for the rear end of the same pivotally mounted on the rear bow structure of the top to swing rearwardly when temporarily out of use, and detachable supporting means for the front end of the cot, whereby said cot may be temporarily stored at the back portion of the automobile, substantially as described.

In testimony whereof, I affix my signature.

HENRY E. ROTTMER.

Copies of this patent may be obtained for five cents each, by addressing the "Commissioner of Patents, Washington, D. C."